US012632392B2

(12) United States Patent
Barnes et al.

(10) Patent No.: US 12,632,392 B2
(45) Date of Patent: May 19, 2026

(54) READ-AS-X PROPERTY FOR PAGE OF MEMORY ADDRESS SPACE

(71) Applicant: Arm Limited, Cambridge (GB)

(72) Inventors: Graeme Peter Barnes, Cambridge (GB); Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/844,294

(22) PCT Filed: Dec. 20, 2022

(86) PCT No.: PCT/GB2022/053304
§ 371 (c)(1),
(2) Date: Sep. 5, 2024

(87) PCT Pub. No.: WO2023/175289
PCT Pub. Date: Sep. 21, 2023

(65) Prior Publication Data
US 2025/0181515 A1      Jun. 5, 2025

(30) Foreign Application Priority Data

Mar. 16, 2022    (GB) ..................................... 2203646

(51) Int. Cl.
*G06F 12/1009*          (2016.01)
(52) U.S. Cl.
CPC ................................ *G06F 12/1009* (2013.01)
(58) Field of Classification Search
CPC ................................................. G06F 12/1009
See application file for complete search history.

(56) References Cited

U.S. PATENT DOCUMENTS 6,252,608 B1 *    6/2001   Snyder ................... G06T 15/60
                                                       345/422
2015/0089146 A1     3/2015   Gotwalt et al.
(Continued)

FOREIGN PATENT DOCUMENTS

EP          3671474 A1     6/2020

OTHER PUBLICATIONS

Combined Search and Examination Report for an International Application No. GB2203646.1, dated Oct. 19, 2022.
(Continued)

*Primary Examiner* — Chie Yew
(74) *Attorney, Agent, or Firm* — NIXON & VANDERHYE P.C.

(57)          ABSTRACT
Processing circuitry (4) performs data processing in response to instructions. Memory management circuitry (28) controls access to memory based on page table information capable of associating a given page of memory address space with a read-as-X property indicative that reads to an address in the given page of memory address space should be treated as returning a specified value X. In response to determining, for a read request issued to read a read target value for a read target block of memory address space, that at least part of the read target block corresponds to a page associated with the read-as-X property, the memory management circuitry (28) controls the specified value X to be returned to the processing circuitry (4) as at least part of the read target value. This enables large regions of memory address space to be treated as storing a specified value without needing to commit physical memory for those regions.

19 Claims, 9 Drawing Sheets

(56) References Cited

U.S. PATENT DOCUMENTS

| | | | |
|---|---|---|---|
| 2016/0019168 A1 | 1/2016 | Rychlik et al. | |
| 2017/0236243 A1* | 8/2017 | Smith | G06F 16/80 |
| | | | 345/501 |
| 2018/0040144 A1* | 2/2018 | Li | G06F 16/9577 |
| 2019/0236026 A1* | 8/2019 | Surti | G06T 1/60 |

OTHER PUBLICATIONS

International Search Report and Written Opinion for an International Application No. PCT/GB2022/053304, dated Mar. 22, 2023.
"Arm® Architecture Reference Manual," Armv8, for Armv8-A architecture profile, 2013-2020.
Bedicheck, "Some Efficient Architecture Simulation Techniques," Department of Computer Science, FR-35 University of Washington Seattle, Washington 98195.
Office Action for IN Application No. 202417069149 dated Jan. 1, 2026, 11 pages.

\* cited by examiner

Normal memory

Read-as-X memory

Read request

Write request

Permission indirection

Permission indirection with value indirection

| VA | PA | Perms | Attr. |
|----|-----|-------|-------|
| 0x8000 | 0x.... | 2 | 7 |
|  |  |  |  |

200

PiR

| Read-as-X-0 |
| Read-as-X-1 |
|  |

202

| X |
|---|
| 77 |
| 15 |
| 9 |
| 6 |
| . . . | n-bits wide

READ-AS-X PROPERTY FOR PAGE OF MEMORY ADDRESS SPACE

The present application relates to the field of data processing.

Memory management circuitry can be provided in a processing system to control access to a memory address space based on page table information for respective pages of the memory address space. For example, the page table information may specify access permissions, address translation mappings and other attributes associated with a given page.

At least some examples provide an apparatus comprising:

processing circuitry to perform data processing in response to instructions; and memory management circuitry to control access to memory based on page table information capable of associating a given page of memory address space with a read-as-X property indicative that reads to an address in the given page of memory address space should be treated as returning a specified value X; in which:

in response to determining, for a read request issued by the processing circuitry to read a read target value for a read target block of memory address space, that at least part of the read target block corresponds to a page associated with the read-as-X property, the memory management circuitry is configured to control the specified value X to be returned to the processing circuitry as at least part of the read target value.

At least some examples provide a method comprising:

performing data processing in response to instructions; and controlling access to memory based on page table information capable of associating a given page of memory address space with a read-as-X property indicative that reads to an address in the given page of memory address space should be treated as returning a specified value X; in which:

in response to determining, for a read request issued by the processing circuitry to read a read target value for a read target block of the memory address space, that at least part of the read target block corresponds to a page associated with the read-as-X property, the specified value X is returned to the processing circuitry as at least part of the read target value.

At least some examples provide a computer program to control a host data processing apparatus to provide an instruction execution environment for execution of target code; the computer program comprising:

instruction decoding program logic to decode instructions of the target code to control the host data processing apparatus to perform data processing in response to the instructions of the target code; and memory management program logic to control access to a simulated memory address space based on page table information capable of associating a given page of the simulated memory address space with a read-as-X property indicative that reads to an address in the given page of the simulated memory address space should be treated as returning a specified value X; in which:

in response to determining, for a read request to read a read target value for a read target block of the simulated memory address space, that at least part of the read target block corresponds to a page associated with the read-as-X property, the memory management program logic is configured to control the specified value X to be returned as at least part of the read target value.

The computer program can be stored on a computer-readable storage medium. The storage medium can be transitory or non-transitory.

Further aspects, features and advantages of the present technique will be apparent from the following description of examples, which is to be read in conjunction with the accompanying drawings, in which:

FIG. 7 illustrates the use of a further indirection table used to specify the specified value X to be returned for a read to a memory address region having the read-as-X property;

Figure 1:
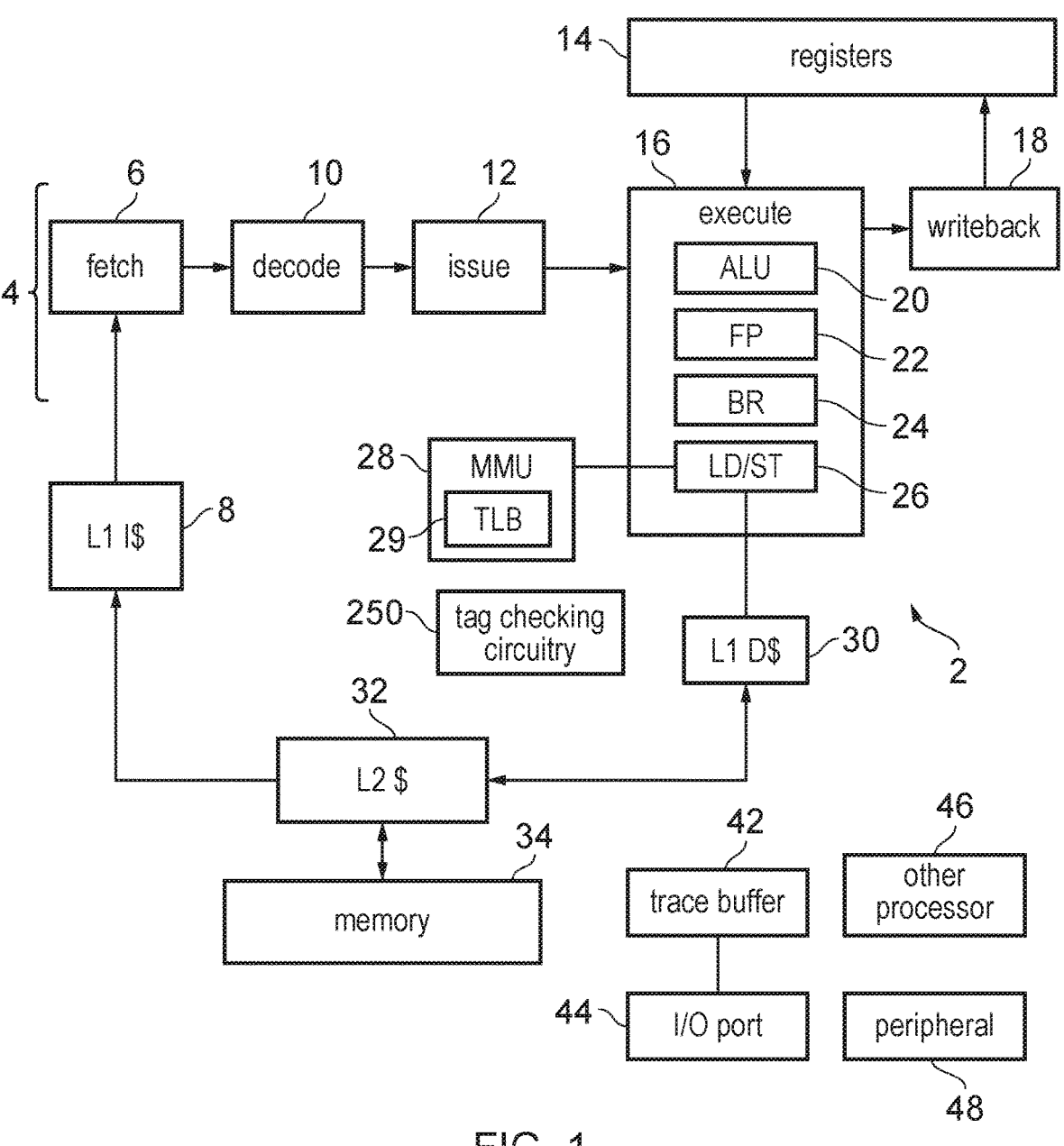
FIG. 1 illustrates an example of a data processing apparatus.

An apparatus has processing circuitry to perform data processing in response to instructions, and memory management circuitry to control access to memory based on page table information having an encoding capable of associating a given page of memory address space with a read-as-X property indicative that reads to an address in the given page of memory address space should be treated as returning a specified value X. In response to determining, for a read request issued by the processing circuitry to read a read target value for a read target block of memory address space, that at least part of the read target block corresponds to a page associated with the read-as-X property, the memory management circuitry controls the specified value X to be returned to the processing circuitry as at least part of the read target value. This enables relatively large regions of memory address space to be treated as storing a specified value X without needing to commit physical memory for those regions of memory address space.

An alternative approach for reducing the amount of physical memory used for regions of memory address space known to have a specified value X can be to allocate a single page of physical memory for storing the specified value X, and to use the page table information to map the virtual addresses of each of the corresponding regions of memory address space to the same physical page. With this approach, no special access permission or attribute types would need to be supported at an architectural level in order to support the ability to use a smaller amount of physical memory to represent a larger region of virtual memory set to the specified value X, because software could use the address translation mapping field of the page table information to provide this behaviuor. However, this approach has a number of disadvantages. Firstly, at least one page-sized block of physical memory still has to be allocated to physically store the data having the specified value X, even if that physical memory can be mapped to a number of different virtual pages. In implementations with larger page sizes (e.g. page sizes greater than 4 kB) or which support the ability for a page table at a higher level of a hierarchical structure to define a block descriptor which defines the same set of attributes for a larger memory region than the size of the region corresponding to one page mapped at the final level of the hierarchy, this approach may still require relatively large amount of physical memory to be committed for representing the specified value X (e.g. a block descriptor could cover several MB or GB of memory). Reserving physical storage for storing a specified value X (which can often be a default value, such as zero, which is not interesting to the software) reduces the fraction of the available physical memory implemented in hardware that is available for storing more useful data not known to have the specified value X. If less physical storage is available for meaningful data, other data may have to be paged out to external storage, which affects performance for accesses that need that data. Also, for the reads to the data having the specified value X, those reads may still be subject to relatively long latency due to the need to access the data from a cache or from the underlying physical memory storage.

In contrast, in the approach discussed below, a page of memory address space can be associated with the read-as-X property by the page table information, which signifies that reads to an address in that page should be treated as returning a specified value X. This means that, when a read request is issued by the processing circuitry to read a read target value for a read target block of memory address space, and the memory management circuitry determines (based on a target address of the read request) that at least part of the read target block corresponds to a page associated with the read-as-X property, then the memory management circuitry can control the specified value X to be returned the processing circuitry as at least part of the read target value. As the memory management circuitry can identify the specified value simply from the page table information, this avoids the need to commit any physical memory for the regions of the memory address space assigned the specified value X. Hence, this enables better utilisation of the remaining physical memory storage implemented in the system, a greater fraction of which can be used for other data not having the specified value X, improving performance for other data which would otherwise have to be sent out to external storage. Also this approach can improve performance for the reads of the specified value X itself, as the memory management circuitry typically looks up the page table information earlier than the access to a cache or memory for reading data stored in physical memory and so can return the value X at an earlier stage of processing.

For at least one variant of the read-as-X property supported by the memory management circuitry, in response to determining that all of the read target block corresponds to a page associated with the read-as-X property, the memory management circuitry is configured to suppress issuing of a cache access request or memory access request for reading the read target value from a cache or the memory. Hence, the use of the read-as-X property can avoid the need for the value X to be read from a cache or memory at all (instead the value X can be generated within the memory management circuitry based on the detected read-as-X property represented in the page table information). By eliminating the latency of a cache access this speeds up the processing of the read request and also frees up cache capacity for other data.

With this variant, it is possible that the read target block specified by a read request could cross a page boundary between one page having the read-as-X property and another page not having the read-as-X property. In this case, only part of the read target value returned to the processing circuitry may specify the specified value X and the other part could be read from a cache or memory as for an normal read access request. In practice, accesses crossing a page boundary would normally require two separate cache lookups as they may also cross a cache line boundary and so the access may effectively be treated as two separate accesses, one for the portion within the first page and the other for the portion within the second page. Hence, one of these accesses corresponding to a non-read-as-X page of memory address space may trigger a cache lookup to access memory as normal, while the other of the accesses corresponding to the read-as-X page may suppress the cache look up and return the specified value X as the value returned for that part of the read target block. In practice, scenarios where a read access only partially corresponds to a read-as-X page may be relatively rare given that it is common to use address alignment of memory accesses to reduce the likelihood that an access crosses a page boundary, and also the page size may be relatively large compared to the size of the read target block so that the likelihood of crossing a page boundary for a given access is low.

The read-as-X property may be useful for a wide range of scenarios where relatively large blocks of memory address space need to be set as storing a particular value. For example, when first initialising regions of virtual address space it may be desirable to clear the previous contents of those regions to ensure that, before any write to those regions is performed, any intervening reads will return a known value (e.g. zero) independent of whatever data was previously stored for those virtual addresses. Hence, newly initialised regions of virtual address space could be assigned the read-as-X property until the first write operation to those regions is encountered. For example, a copy on write approach may be used by the software, in which on initial allocation the attributes for the newly initialised page may be set to indicate read-as-X, so that the first write to that page will trigger a fault which can cause an exception handler to allocate a new block of physical memory, map that physical memory to the virtual page using an address translation mapping in the page table information, and then clear the read-as-X property so as to subsequently treat the virtual page as normal memory. By providing an architecture supporting the read-as-X property, this copy on write approach desired by software can be supported with higher utilisation of physical storage and improve performance compared to the alternative of controlling copy on write by using the address translation mapping to map to a single page of physical memory committed for storing the specified value X as described above.

Of course, this copy on write approach is just one example and there may be many other cases when software may find it useful to be able to represent, without committing physical memory storage, that a region of virtual address space is treated as having the specified value X.

Another example where the read-as-X property can be useful is in a system which supports tag checking circuitry to perform a tag checking operation to determine whether an address tag associated with a target address of a memory access request corresponds to an allocation tag associated with a memory system location corresponding to the target address. The tag checking circuitry triggers a tag error handling response in response to the tag checking operation detecting a mismatch between the address tag and the allocation tag. As discussed in more detail below, such a tag checking operation can be useful for providing architectural support for detecting certain memory usage errors which may cause security vulnerabilities which could be exploited by an attacker wishing to cause software to access a region of memory which the software should not be able to access. When a region of memory address space is initially allocated it can be assigned a corresponding allocation tag and the pointer intended to be used to refer to that region of memory address space can be assigned the corresponding address tag. When a pointer is subsequently used to generate an address for accessing memory, the tag checking circuitry can (at least when in a tag checking mode) compare the address tag of the target address of the memory access request against the allocation tag associated with the addressed memory system location, and then trigger a tag error handling response in response to any detect mismatch. The tag error handling response could be a range of actions such as triggering a fault, logging the error in an error log or other storage location, etc.

In systems supporting tag checking operations, the allocation tag for a block of memory may itself be accessed by a read access to a particular block of memory address space, and so the allocation tags themselves may consume physical storage. A certain tag value may be so common that it may be common for relatively large regions of the memory address space of size greater than one page to be set by software as having the same tag value. For example, software may choose to set specific values of allocation tags for regions of memory address space for which there is a greater security requirement and then leave the allocation tags for any other region of memory as having a certain default tag value (e.g. zero). By prioritising the use of non-default tag values for the allocation tags of the regions with greater security requirement, this reduces the chance that a memory access not intended to access one of these regions happens to, by chance, have an address tag which matches the allocation tag of the addressed memory system location. This means that it could be relatively common that software may wish to configure the allocation tags for relatively large regions of memory as all having the same tag value (e.g. zero). Hence, in the absence of support for the read-as-X property, a relatively significant amount of physical memory storage could be used merely for storing a default allocation tag value for the regions of memory for which there is no specific security requirement. By associating the read-as-X property with the pages of memory address space intended to hold allocation tag values having a specified value X, this can greatly improve the efficiency of utilisation of available physical memory storage in a system supporting memory tagging.

Hence, in response to the memory management circuitry determining, for a tag read request to obtain a given allocation tag to be checked in the tag checking operation, that a page corresponding to the given allocation tag is associated with the read-as-X property: the memory management circuitry is configured to control the specified value X to be returned as the given allocation tag; and the tag checking circuitry is configured to perform the tag checking operation using the specified value X for the given allocation tag. Hence, the tag checking operation can be performed using the specified value X provided by the memory management circuitry without needing to access the cache or physical memory storage to obtain the specified value X, which can improve performance and utilisation of available physical memory.

In a system supporting memory tagging, the read-as-X property is capable of being specified for both: a page of the memory address space used for storing data; and a page of the memory address space used for storing allocation tags.

Hence, the read-as-X mechanism need not be a data-specific or tag-specific property, but may be a generic architectural mechanism available for use for any information to be associated with a page of memory address space.

In some examples, for at least one variant of the read-as-X property, in response to determining that the read target block corresponds to a page associated with the read-as-X property, the memory management circuitry controls the specified value X to be returned to the processing circuitry as part of the read target value and to allow a cache access request or memory access request to be issued for reading another part of the read target value from a cache or the memory. In this case, the specified value X is returned only for part of the read target value, with the other part returned from the cache or memory as for a normal memory access. This could be useful to allow data actually stored in physical memory to be expanded to a wider form with additional bits implied based on the read-as-X property which do not need to be stored in physical memory. For example, for a system supporting memory tagging, the specified value X returned for part of the read value could indicate the allocation tag which is implicitly defined in association with the corresponding data stored in physical memory, so that the allocation tags for memory regions to be assigned a default allocation tag value can be implicitly determined based on the read-as-X property without requiring physical memory to be committed for storing those tags.

Any data value or pattern of bits can be assigned as the specified value X for pages with the read-as-X property.

For example, for at least one variant of the read-as-X property, the specified value X is zero. Treating pages with the read-as-X property as containing zero can be particularly useful because there may be a greater number of software use cases where large regions of memory are to be treated as storing zero than would be the case for other non-zero values. For example, the copy-on-write and memory tagging use cases described above may both be more likely to assign zeros to the read-as-X pages than other non-zero values.

However, it is also possible to implement at least one variant of the read-as-X property with the specified value X having a non-zero value. For example, for at least one variant of the read-as-X property, the specified value X is a value having all bits set to 1. For example, in the memory tagging example an allocation tag value having all bits set to 1 could be reserved for special purposes (e.g. it could signify a "match all" tag value indicating that the tag is to be treated as matching any address tag value). Hence, X=111111 . . . may also be a good candidate for assigning to large regions of memory address space so as to justify the architectural support for an encoding of the page table information representing that reads to a page are to be treated as returning all bits equal to 1.

It would also be possible to have the specified value X being a value with a mixture of bit values of 0 and 1. The specified value X could be considered to be a single value spanning the entire page, or X could alternatively be considered to have a smaller number of bits which is repeated a number of times to fill the memory range corresponding to the page having the read-as-X property.

It will be appreciated that there is a trade-off between the number of different options supported in the architecture for defining the specified value X and the amount of encoding space needed to represent these different options in the page table information or other configuration information. Some implementations may support read-as-X encodings corresponding to a single variant of the specified value X (e.g. X=0). In other examples, the memory management circuitry is configured to support two or more variants of the read-as-X property corresponding to different values for the specified value X, to allow use of the read-as-X behaviour for a range of different values to be assigned to regions of virtual memory without consuming physical memory.

In one example, the memory management circuitry may support an address-dependent variant of the read-as-X property for which, when a given page is associated with the address-dependent variant of the read-as-X property, the specified value X depends on an address of the given page so that the memory management circuitry is capable of selecting different values as the specified value X to be returned as the read target value for different pages of the memory address space associated with an identical encoding of the read-as-X property. For example, the specified value X could be selected depending on at least one bit of the address. For example, some architectures may use one or more most significant bits of the address (excluding any upper address bits not used to select memory locations) to indicate whether an access is being made from user address space or kernel address space and it may be useful to return different values as the specified value X for the read-as-X property depending on whether a user or kernel access is being requested. This approach avoids the need to consume two different encodings of the page table information in order to support this behaviour, as a single type of read-as-X property may serve both purposes, with the additional information for selecting which value to return as the specified value X coming from the address itself rather than the page table information.

For writes to pages designated as having the read-as-X property, a range of different behaviours can be implemented. One option is for a write to a read-as-X page to trigger signalling of a fault, which can be useful for supporting the copy-on-write approach discussed above, where the fault may cause an exception handler to execute and allocate some physical memory for the page to be written, before removing the read-as-X property for that page.

Alternatively, a write request to a read-as-X page could simply be ignored, without interrupting processing on the processing circuitry by raising a fault. In this case, to implement a copy-on-write behaviour, software may also set an access permission for the read-as-X page to indicate that write accesses are not permitted, so that a fault can be generated on the first write to the page to allow for dynamic allocation of physical memory once actually required to store some data other than the specified value.

Another option is that a write to a page designated as read-as-X could be interpreted as requesting that at least part of the write value (the value specified by the write request as to be written to the write target block of address space) is forwarded to a predetermined system location. For example, the predetermined system location could be a location other than random-access memory storage. For example, the predetermined system location can be one of: a trace buffer for storing diagnostic trace information; another processor other than a processor comprising the processing circuitry that issued the write request; and a peripheral (input/output device). Use of the read-as-X property for a virtually addressed page of address space could be a faster way of identifying the target location to be forwarded with the write data, compared to translating the virtual address to a physical address, issuing a regular write request to the memory system specifying that physical address, and then using a physical address mapping component within the memory system to determine that the address corresponds to the predetermined system location and forwarding the write data to that location. Hence, for system locations where there is not going to be any need to read data from the predetermined system location, but an accelerated means of writing data to the predetermined system location is desired, the read-as-X property can be useful. Example use cases can include:

trace buffers, to which diagnostic information can be sent for subsequent analysis to investigate behaviour and performance issues arising when a particular software program is executed on a processor. Instrumented software code could include a write memory access at a certain point of the code specifying the trace information to be written to the trace buffer, and when the address of that memory access is mapped to a read-as-X page, this can cause the trace information to be forwarded to the trace buffer faster than using regular access mechanisms.

accelerated access to an input/output buffer of a network or other communications interface.

accesses to shared components that might require more information than the standard memory system bus interface can provide, e.g. accesses to a DMA where it may be advantageous to pass information about a current execution context, or embedded tightly-coupled multi-CPU systems operating in a producer-consumer mode, where the page table attribute could be used to indicate a particular hardware FIFO (first-in, first-out buffer) is used for instance.

It will be appreciated that processing system designers may find other uses of such a write behaviour for read-as-X memory pages of memory address space.

Hence, in response to determining, for a write request issued by the processing circuitry to write a write value to a write target block of memory address space, that at least part of the write target block corresponds to a page associated with the read-as-X property, the memory management circuitry is configured to process the write request according to a read-as-X write behaviour; the read-as-X write behaviour comprising one of: triggering signalling of a fault; ignoring the write request; and forwarding at least part of the write value to a predetermined system location (e.g. the trace buffer, another processor or peripheral).

For some implementations of the instruction set architecture, a single type of read-as-X write behaviour (e.g. faulting on writes to read-as-X memory) may be implemented and it may not be possible for software to select a different read-as-X write behaviour.

In other examples, the memory management circuitry may support two or more variants of the read-as-X property corresponding to different read-as-X write behaviours. In this case, the particular read-as-X write behaviour to be used for a particular write request may depend on software-configurable control information, which could be specified either in the page table information itself or separately in a control register or other configurable storage element. For example, the read-as-X write behaviour could be specified on a page-by-page basis within the page table information or in other information referenced from the page table information for a particular page, or alternatively could be a global setting set for the apparatus of the whole, for example using a control register which indicates information (e.g. a read-as-X write mode specifying value) allowing the read-as-X write behaviour to be determined.

The read-as-X property of a given page of address space can be encoded in different ways. In one example, the memory management circuitry determines that the given page has the read-as-X property when a field of a page table entry corresponding to the given page has an encoding indicating the read-as-X property. Hence, in this case the page table entry encoding may directly specify whether the given page has the read-as-X property.

Another approach can be that the memory management circuitry determines that the given page has the read-as-X property when a page table entry corresponding to the given page specifies an indirection table entry selecting value indicating a selected entry of an indirection table and the selected entry of the indirection table has an encoding identifying the read-as-X property. This can be useful if there is insufficient spare encoding space within the page table entry format to be able to encode all the types of memory attributes/permissions available for selection by the programmer. As the indirection table need not include an entry per page there can be more space for representing a wider set of options for the properties to be selected for a given page than would be practical in the page table entry itself (the total number of indirection table entries may be smaller than the total number of property types selectable for a single indirection table entry, so that the indirection table entry selecting value in the page table entry has fewer bits than the number of bits in one indirection table entry. Hence, in some examples the read-as-X property could be encoded in a referenced entry of the indirection table rather than directly in the page table information.

The indirection table could be a structure stored in memory or could be a hardware structure implemented using control registers accessed by system register instructions for example.

In an approach supporting the indirection table, the memory management circuitry can support at least two different encodings for the selected entry of the indirection table which correspond to different variants of the read-as-X property. For example the different variants of the read-as-X property could correspond to different values for the specified value X, different read-as-X write behaviours, or could be distinguished by other access permissions or attributes to be indicated in combination with the read-as-X property.

In one approach, the memory management circuitry may determine the specified value X for the given page based on an encoding of a further entry in a further indirection table, the further entry indicated by an encoding of the selected entry of the indirection table. This recognises that the number of different values which software may wish to specify for the specified value X may be much greater than the number of different property variants or behaviours (distinguished by features other than the value of the specified value X) that are to be defined for the read-as-X property, and so defining an indirection table to define the attribute/behaviour variant for read-as-X (other than the specified value X) and a further indirection table to define the specified value X can be more efficient than a single table which has encoding to represent each desired combination of property/behaviour/specified value for a read-as-X property.

To support normal memory accesses to pages not designated as read-as-X memory, a given page table entry corresponding to a given page of the memory address space may specify an address mapping field, which is used to perform address translation when the given page is not associated with the read-as-X property. The address mapping field may often be the largest field of the page table entry, taking up a significant fraction of the overall number of bits of the page table entry.

However, when a page is associated with the read-as-X property, as no physical memory is allocated for that page, address translation is not required and so the address mapping field may be unused.

In some examples, to avoid needing to use up further encoding space to encode other information, for a page associated with the read-as-X property, the memory management circuitry can use the address mapping field of the given page table entry for a purpose other than address translation. Hence, for read-as-X pages there may be a greater amount of encoding space available in the page table entry than would otherwise be possible for normal memory. For example, the specified value X could be indicated using the address mapping field. It is also possible to indicate other variants of the read-as-X property (such as different read-as-X write behaviours or other attributes to be combined with the read-as-X property) using the address mapping field. By reusing the address mapping field to encode such information, there is less need to expand the page table entry format or use other structures such as an indirection table to encode this information.

Other implementations may prefer not to use the address mapping field to encode information about the read-as-X property that is understood by the memory management circuitry to have a prescribed architecturally-defined meaning. Instead, the address mapping field of a page table entry associated with the read-as-X property may be left free for software to use for arbitrary software-defined purposes not prescribed by the instruction set architecture supported by the processing circuitry.

Specific examples are now described with reference to the drawings. It will be appreciated that the claims are not limited to these specific examples.

FIG. 1 schematically illustrates an example of a data processing apparatus 2. The data processing apparatus has a processing pipeline 4 (an example of processing circuitry, which could for example form part of a CPU (Central Processing Unit)). The processing circuitry 4 is for executing instructions defined in an instruction set architecture (ISA) to carry out data processing operations represented by the instructions. The processing pipeline 4 includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions defined in the ISA that are decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34.

A memory management unit (MMU) 28 is provided for controlling memory access permission checks and performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region. While the MMU 28 is shown as associated with the load/store unit 26, the MMU 28 may also be looked up on instruction fetches triggered by the fetch stage 6 (or a separate instruction-side MMU may be implemented to handle instruction fetches, separate from the data-side MMU used by the load/store unit 26 for data accesses—in this case both MMUs can cache in their TLBs 29 information from a shared set of page tables).

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel.

The apparatus 2 may also include a number of system components which may be accessible to the processing circuitry 4 by issuing memory access requests specifying addresses mapped to those system components. For example, the system components may include a trace buffer 42, used to record diagnostic information which can be accessible to an external device via an I/O (input/output) port 44. The external device may use the diagnostic (trace) information for performing diagnostic analysis of the software executing on the processing circuitry 4, e.g. for the purpose of identifying performance issues with the software. The diagnostic information could indicate information about program flow of the sequence of instructions executed in the software, data accesses made by the software, and internal state of the processor when executing the software, for example. Trace hardware could be provided to automatically record the trace information in response to monitoring of software execution and processor state. Alternatively, if the software has been instrumented with trace generating instructions, the software itself may execute an instruction (e.g. a write access request specifying an address mapped to the trace buffer 42) to cause software-defined trace data to be written to the trace buffer 42.

Another example of a system component can be further processor 46 (e.g. another CPU) which, although not explicitly indicated in FIG. 1, could include similar components 4, 8, 14, 28, 30, 32 to those shown for a first processor in FIG. 1. Inter-processor communication may be performed using read/write memory access requests managed by the MMU 28. The memory system may include a coherent interconnect for maintaining coherency between caches of the respective processors using any known coherency protocol.

Also, the system includes a number of peripheral (input/output) devices 48. For example the peripherals 48 may include a hardware accelerator designed to accelerate a specific processing function, a network controller, a display controller, a user input device, or any external (off-chip) device communicating with the system 2 via an input/output port. Again, interaction with peripherals and I/O devices is done by issuing read/write memory accesses specifying addresses mapped to those components.

The apparatus 2 may also include tag checking circuitry 250 which is described in more detail below with respect to FIG. 9.

It will be appreciated that FIG. 1 is merely a simplified representation of some components of a possible processor pipeline implementation, and the processor may include many other elements not illustrated for conciseness.

Figure 2:
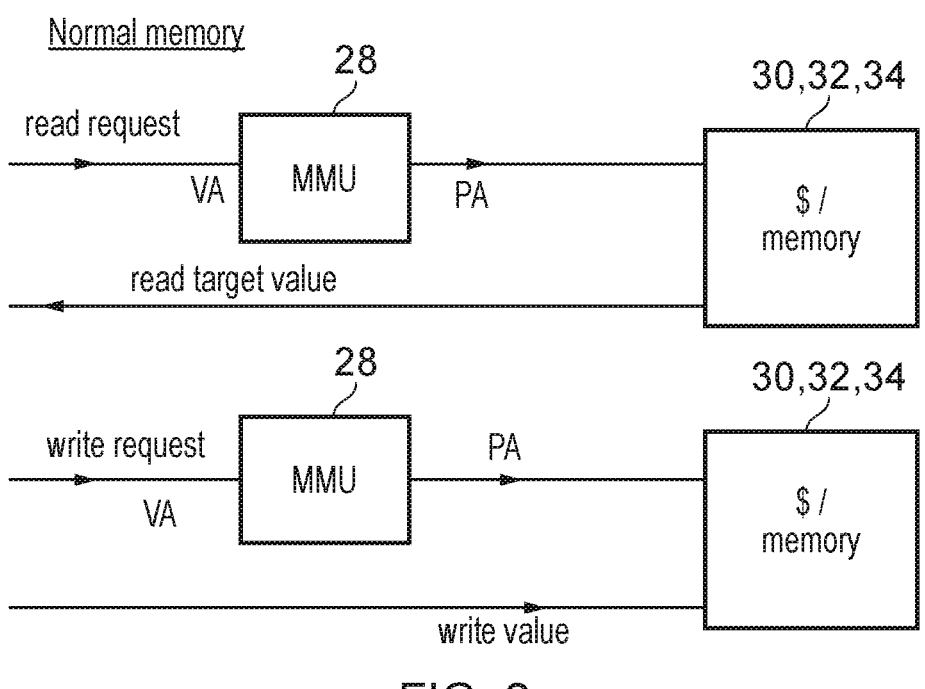
FIG. 2 illustrates handling of read requests and write requests to memory.

FIG. 2 illustrates processing of read and write requests to pages of an address space treated as "normal" memory. The "normal" memory type can be used for a page intended to be used for regular random-access data or instruction storage. When a read request is received, the MMU 28 looks up the virtual address specified by the read request in its TLB 29. If the TLB 29 already includes page table information for the virtual address, then the attributes and address translation mapping information provided by the page table information are used to control translation of the virtual address into a physical address, check access permissions to determine whether the read request can be allowed (with a fault signalled if the read request is not allowed), and control the way in which the read request could service based on the attributes (e.g. the attributes could specify whether data for the page is cacheable) If the TLB 29 does not already include the required page table information for the virtual address then a page table walk operation is performed to obtain the required page table information from page table structures stored in the memory system, before proceeding to check the access permissions and perform address translation. Hence, for a read access for which the attributes in the page table information specify the "normal" memory type then, provided the access permissions are satisfied, the virtual address of the read access is translated into a physical address and then a read memory access request specifying that physical address is sent to the memory system. If the memory access request hits in one of the caches 30, 32 then the data for the specified physical address can be read out from the cache and returned to the processing circuitry 4. If the request misses in the caches 30, 32, access to main memory 34 is performed and the read target value returned to the processing circuitry 4, e.g. by writing the value to a register 14.

For a write request, the lookup of the TLB 29 and (page table walk if necessary) are the same as for a read request. Based on the attributes defined in the page table information for the virtual address of the write request, the MMU 28 determines whether the write request is allowed and if so generates a write memory access request specifying a translated physical address obtained based on the target virtual address and the address mapping information specified in the page table information. The write request requests that a write data value provided by the processing circuitry 4 (e.g. based on an operand read from a register 14) is written to a corresponding location in the cache 30, 32 and/or main memory 34.

For various reasons it can be useful sometimes for software to be able to control relatively large regions of the virtual address space to be assigned a predetermined value, such as being filled with zeroes. Many operating systems implement a mechanism (in software) to provide copy-on-write zero-filled memory. Typically, this is done by setting the address translation mapping for the zero-filled regions of virtual addresses to map all of those regions to a single range of physical memory to which zeros are stored. Hence, the amount of physical memory required to be committed can be reduced to the region (e.g. a page or block) covered by a single page table entry of the page table information. However, when page sizes larger than 4 kB are supported or larger regions of memory (e.g. of sizes in the order of MB or GB) are covered in a single page table entry at a higher level of a page table hierarchy using a block descriptor, it becomes expensive to reserve this amount of physical memory simply for storing the zeros.

Figure 3:
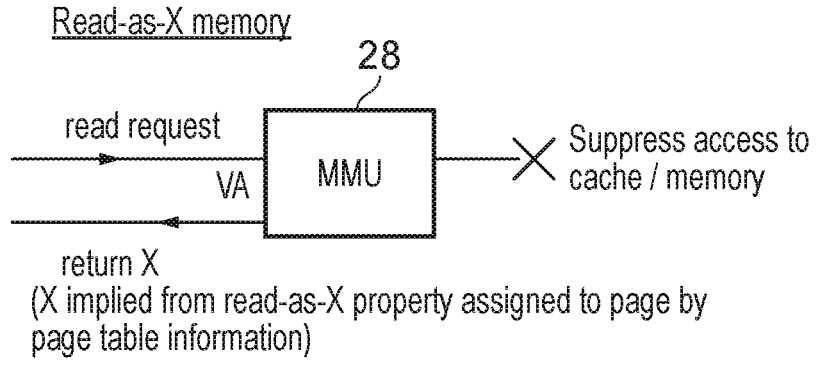
FIG. 3 illustrates handling of read requests and write requests to a region of memory address space designated by page table information as being associated with a read-as-X property.
Figure 3:
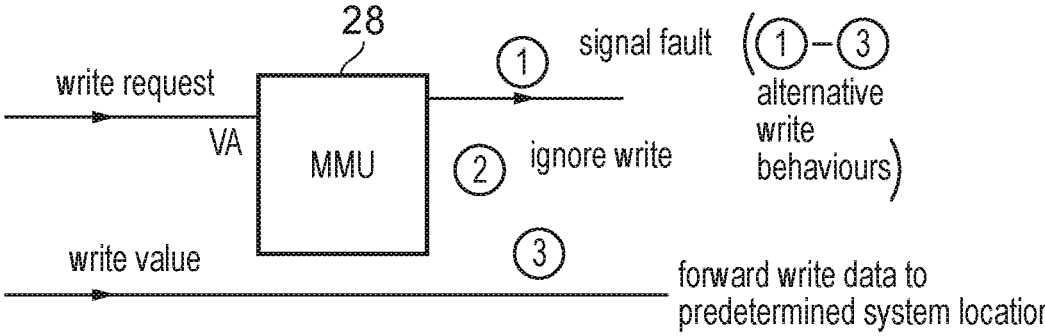

FIG. 3 illustrates a new memory type that can be supported by the MMU 28, called "Read-as-X" memory. The page table information used by the MMU 28 may associate a given page of the virtual address space with the read-as-X property, indicating that reads to that page should return a specified value X. The value of X can be implied from the read-as-X property itself or from other information defined by the page table information, and so does not need a cache or memory access to identify the numeric value of X. Hence, on a read request when the MMU 28 identifies from the corresponding page table information for the read target virtual address that the read target block of data sought to be read by the read request falls within a page associated with the read-as-X property, the MMU 28 does not need to translate the virtual address to a physical address and can suppress any access to the cache 30, 32 or memory 34 which would otherwise be issued to obtain the value of the read data. Note that cache/memory accesses might still be needed if a page table walk is required, to obtain the page table information associated with the read target virtual address, even if cache/memory accesses can be suppressed for obtaining the data value of X. The MMU 28 can generate the specified value X using internal circuit logic of the MMU 28, and return this value to the processing circuitry 4 as a result of the read operation. The specified value X could be zero, for example, or could be a non-zero value such as a value having all bits set to 1, or another binary value expected to be used often enough to justify a dedicated encoding in the page table information or other information referenced by the page table information. If the specified value X has fewer bits than the size of the read block of data, it can be repeated to fill the read block of data being returned.

Hence, unlike the software-implemented copy-on-write mechanism described above (which can be implemented using existing architectural mechanisms for supporting address translation and access control using read/write access permissions), the read-as-X property is a new architectural property defined in the page table information supported by the MMU 28. While this may require some additional encoding space in the page table information, this has several benefits over the software-implemented copy-on-write mechanism for filling large regions of memory with a predetermined value. Firstly, as there is no access to the cache or physical memory for obtaining the specified value X, this means that no physical memory has to be committed at all for the regions assigned the specified value X, so even if a relatively large page/block size used, it is not necessary to consume a large block of physical memory for actually storing the specified value X. This means that the available physical storage implemented in the processing system can be utilised more efficiently as more of the storage is available for storing other data which has more meaningful values other than the specified value X. This reduces the amount of meaningful data that has to be exported to external (off-chip) storage, improving performance for code that requires that other data. Also, as there is no need for a cache or memory access to obtain the specified value X, then the read requests that targets the page having the read-as-X property can be processed faster and so performance is improved.

If a write request is issued specifying an address which the page table information associates with the read-as-X property, then several different read-as-X write behaviours are possible. FIG. 3 shows several options. A first option is to signal a fault when a write request is issued targeting a page having the read-as-X property. This can be useful for supporting copy-on-write as on a first write to zero-filled virtual page, the fault may cause the operating system to allocate some physical memory for that virtual page and then proceed to process the write after the virtual page has been mapped that physical memory. Another option is simply to ignore the write operation and not write data to any physical memory. This could be chosen to reduce the likelihood of faults if the read-as-X property is being used for a purpose other than copy-on-write where a fault is not necessary but there should be an architecturally-prescribed technique for dealing with writes to read-as-X memory (it may be expected that if software has designated the memory as read-as-X, such writes would be rare). A third option is that the write data of the write request may be forwarded to a predetermined system location, such as the trace buffer 42, another processor 46 or a peripheral 48. Forwarding of data to such system locations could otherwise be performed using read or write memory accesses to virtual addresses (not having the read-as-X property) which a translate to a physical address identified by the memory bus infrastructure as corresponding to that system location. However, with regular accesses such forwarding would require an address translation to the corresponding physical address and then a memory access request specifying the physical address to be sent to the memory system, so that a mapping component implemented within the memory system can then identify, based on the target physical address, the system location that is the destination of the write data. In contrast, by using the read-as-X property the fact that the write data is to be forwarded to a predetermined system location may be identified by the MMU 28 from the page table information (either directly or using an indirection table referenced by the page table information) and so the delay of forwarding a memory access request to memory system and waiting for a mapping component to identify the target location of the data can be reduced, as the MMU 28 could specify the destination directly without invoking that mapping component. Hence, the read-as-X write behaviour which forwards data to a predetermined system location can provide accelerated access to a system components such as a trace buffer 42 (used to record diagnostic information on the running of software on the processing system), another processor 46, or a peripheral (such as a DMA controller, network controller, or hardware accelerator).

Figure 4:
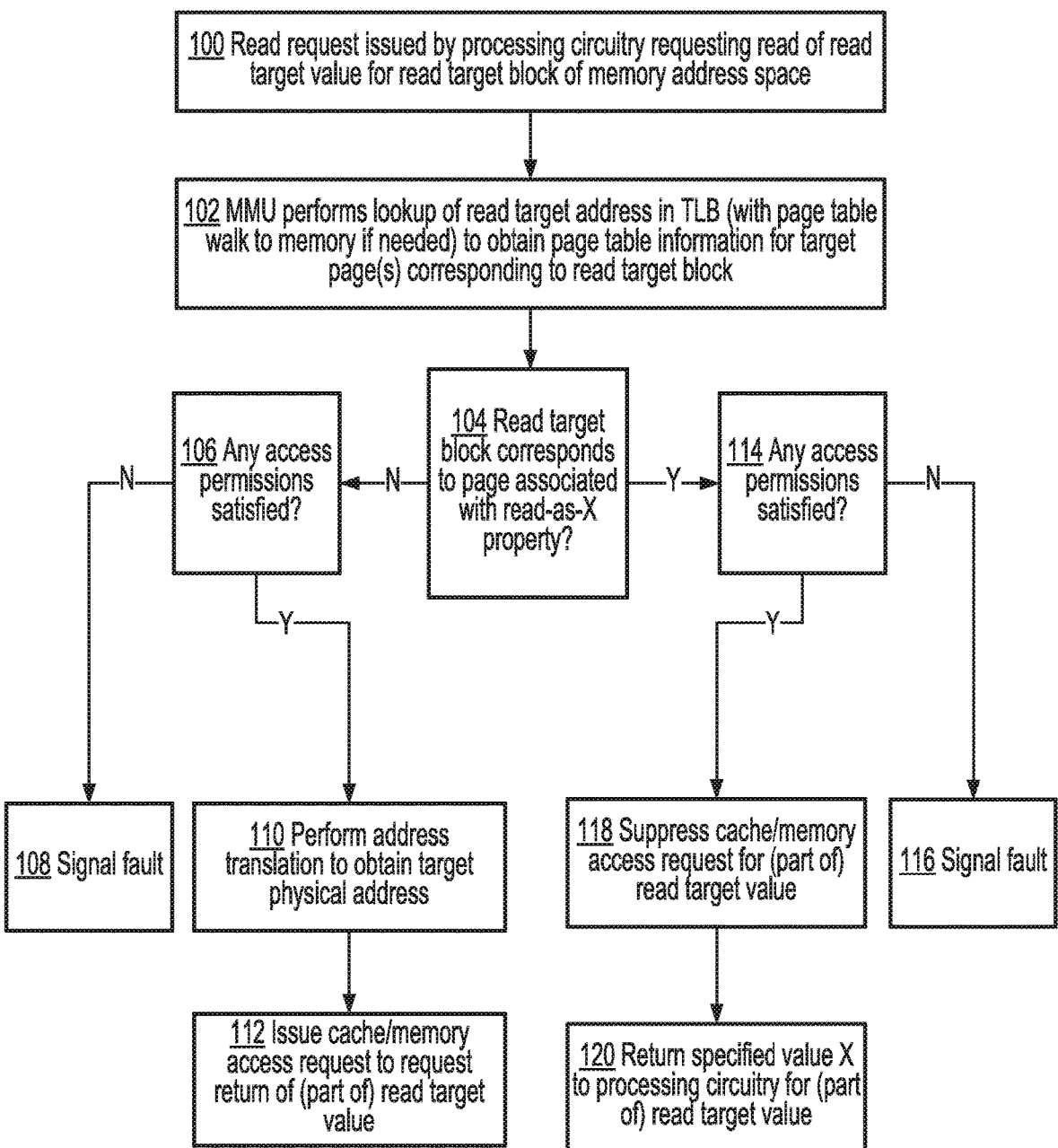
FIG. 4 is a flow diagram illustrating handling of read requests.

FIG. 4 is a flow diagram showing handling of read requests. At step 100, a read request is issued by the processing circuitry 4 requesting that a read target value is read from the memory system location associated with a read target block of memory address space. The read request may specify a read target address, and optionally a size parameter, identifying the read target block.

At step 102, the MMU 28 performs a look up of the read target address in the TLB 29, to look for page table information for the target page corresponding to the read target block. If the TLB 29 does not already store the required page table information then a page table walk operation may be performed to traverse page table structures stored in memory to obtain the required page table information. If no valid page table information has been defined in the page table structures for the required target page, a fault can be signalled and the method of FIG. 4 halted.

At step 104, the MMU 28 determines, based on the obtained page table information, whether the read target block corresponds to a page associated with the read-as-X property. If not, then at step 106, the MMU 28 determines whether any access permissions specified in the page table information for the target page are satisfied, and if there is any breach of the access permissions then at step 108 a fault is signalled. If the access permissions specified in the page table information are satisfied, then at step 110 the MMU 28 performs address translation based on address mapping information specified in the page table information, to obtain a target physical address corresponding to the virtual address specified as the read target address. In some states of the processing circuitry 4, the address mapping from the virtual address to the physical address may depend on two stages of page table structures: a stage-1 page table structure defining mappings from the virtual address to an intermediate address based on mapping information set under control of an operating system executing on the processing circuitry 4, and a stage-2 page table structure defining mappings from the intermediate address to the physical address based on mapping information set under control of a hypervisor executing on the processing circuitry 4. In other operating states of the processing circuitry 4, the translation may be in a single stage direct from virtual address to physical address. Any known address translation technique may be used to perform the address translation.

At step 112, the MMU 28 returns the translated physical address to the load/store unit 26 of the processing circuitry 4, and the load/store unit 26 issues a cache access request to request that at least part of the read target value is returned from the level 1 cache 30. If the request misses in the level 1 cache then further requests may be sent to the level 2 cache 32 or main memory 34. In some cases, the cache access may be bypassed, for example if the page table information indicates a non-cacheable page, in which case the request may target memory 34 directly. The read target value is obtained from one of the storage structures 30, 32, 34 of the memory system, and is returned to the processing circuitry 4, to store the value in registers 14 for example, from which the value can be used as an operand for a subsequent instruction processed by the processing circuitry 4.

On the other hand, if at step 104 the read target block was determined as corresponding to a page associated with the read-as-X property, then at step 114 again the MMU 28 determines whether any access permissions specified in the page table information are satisfied by the read request and if not then at step 116 a fault is signalled. If the access permissions are determined to be satisfied, then at step 118 the cache or memory access request (that would normally be issued to request that the read target data is returned to the processing circuitry 4) is suppressed, and instead at step 120 the specified value X is returned to the processing circuitry 4 as a value corresponding to at least part of the read target block. Again, the returned data value can be stored in a register 14 of the processing circuitry. The specified value X is deduced from the page table information or other information referenced by the page table information, and so does not need any cache or memory access to determine the specified value X.

On rare occasions, the read target block could cross a page boundary between one page marked as having the read-as-X property and another page not having the read-as-X property. In this case, the portions of the read access to the read-as-X page and the non-read-as-X page can effectively be treated as two separate accesses which will require separate lookups of page table information at step 102 and trigger separate processing of the respective steps 106 to 112 for the non-read-as-X page and steps 114 to 120 for the read-as-X page. Hence, in this case only part of the read target value requested by the read request would be generated by the MMU 28 as the specified value X, and the other part corresponding to the non-read-as-X page would be obtained from the memory system at step 112. Hence, it is not essential for the entire read target value of a read request to be returned as the specified value X as the read request may only partially target a read-as-X page.

Figure 5:
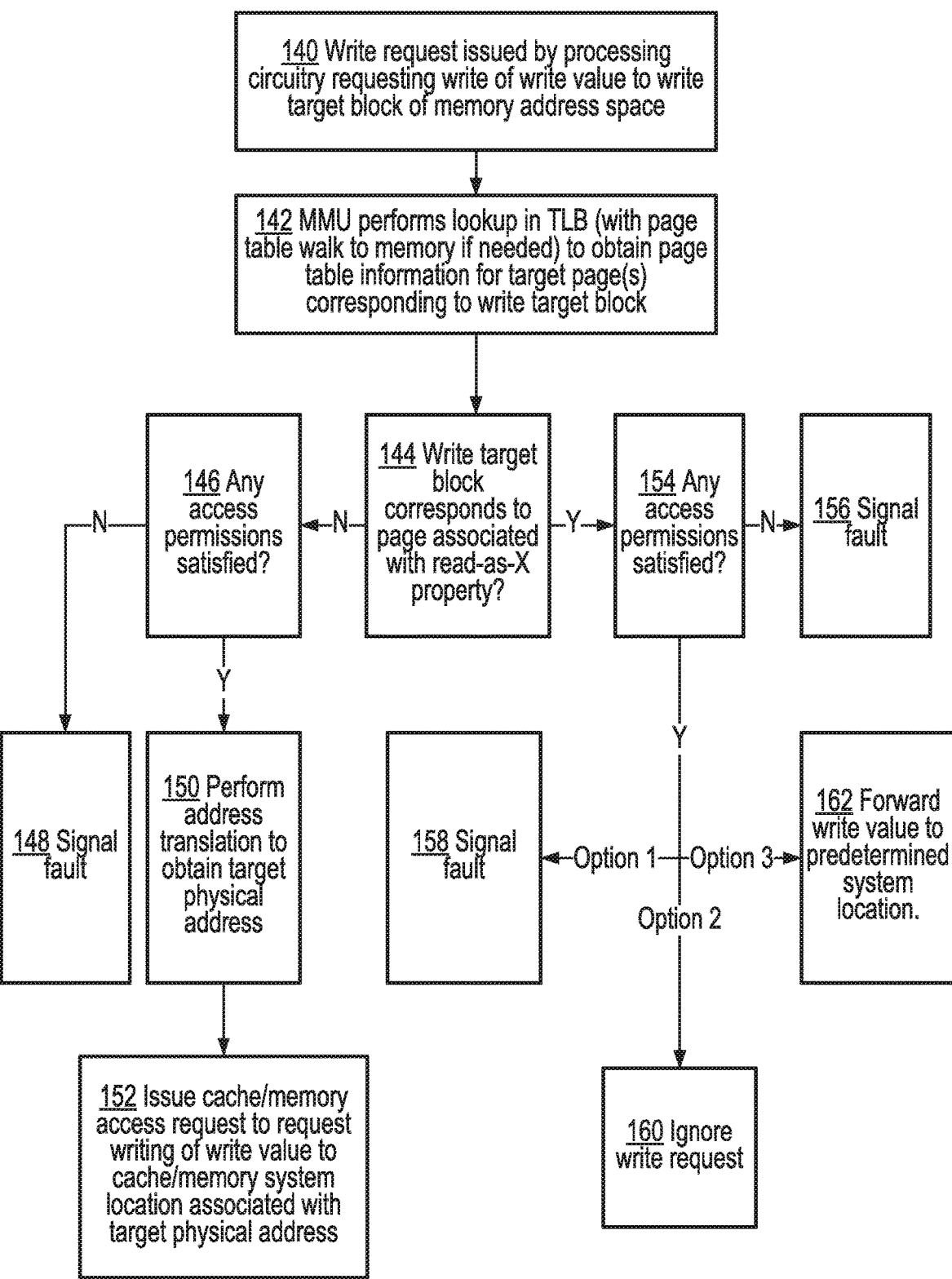
FIG. 5 is a flow diagram illustrating handling of write requests.

FIG. 5 is a flow diagram illustrating processing of a write request. At step 140, a write request is issued by the processing circuitry 4 requesting a write of a write value to memory system locations associated with the write target block of memory address space. As for the read request, at step 142 the MMU 28 performs a lookup of the write target address specified by the write request in the TLB 29, to look for the page table information for the target page corresponding to the write target block of addresses. Again, a page table walk can be performed to access page table structures in memory, if the TLB 29 does not already have the required information. At step 144, the MMU 28 determines, based on the obtain page table information, whether the write target block of addresses corresponds to a page associated with the read-as-X property.

If the target page associated with the write target block is not a read-as-X page, then at step 146 any access permissions specified by the corresponding page table information are checked, and if an access violation is identified, a fault is signalled at step 148. If the access permissions specified for the page targeted by the write request are satisfied, then at step 150 the MMU 28 performs address translation in the same way as at step 110 of FIG. 4, to obtain the target physical address of the write access. At step 152, a cache or memory access request is issued by the load/store unit 26 to request writing of the write value specified by the write request to a memory system location (in cache 30, 32 or the memory 34) associated with the target physical address.

If at step 144 the write target block was determined as corresponding to a page associated with the read-as-X property, then at step 154 the MMU 28 again checks any access permissions required to be satisfied for accesses to the target page and if any access permissions are not satisfied then at step 156 a fault is signalled.

If it is determined, for a write access to a read-as-X page, that any other access permissions required for writes to be permitted are satisfied, then there are several options for responding to a write request to a read-as-X page of the address space. In a first option, at step 158 a fault is signalled. In a second option, at 160 the write request is simply ignored without issuing any write request to the cache or memory, but no fault is signalled and so processing is allowed to continue uninterrupted by the processing circuitry 4. In a third option, at step 162 the write value specified by the write request is forwarded to a predetermined system location, such as the trace buffer 42, other processor 46 or peripheral 48. Some implementations may only support one of the options indicated that steps 158, 160 and 162. Other implementations may support two or more of these options and which option is taken for a particular write request may depend on control information which is programmable by software (e.g. the ability to program this control information may be restricted to software of a certain privilege level or higher, such as operating system or hypervisor software). For example, the control information could be the page table information itself which could directly specify which read-as-X write behaviour is to be taken in response to write request to a read-as-X page, or the control information could be an indirection table referenced by the page table information which provides more information on how to handle the write requests to the read-as-X page. Alternatively, the control information which controls which read-as-X write behaviour to use could be independent of the page table information and not directly or indirectly referenced by the page table information (e.g. the control information could be global information used to control read-as-X write behaviour for all pages, not page-specific information specific to an individual page). For example, a control register could indicate a mode status value which indicates the read-as-X write behaviour to be used in a current mode of operation, which may be applied globally for any pages of the address space associated with the read-as-X property.

The page table information may encode the read-as-X property in a number of different ways. In some cases, the page table entry for a given page of the address space may directly specify a memory attribute or permission type value which identifies that the page has the read-as-X property. For example, one or more bitfield encodings of a permissions or attribute field of a page table entry may be assigned to indicate the read-as-X property, with other encodings of that field identifying other types of permissions or attributes.

Figure 6:
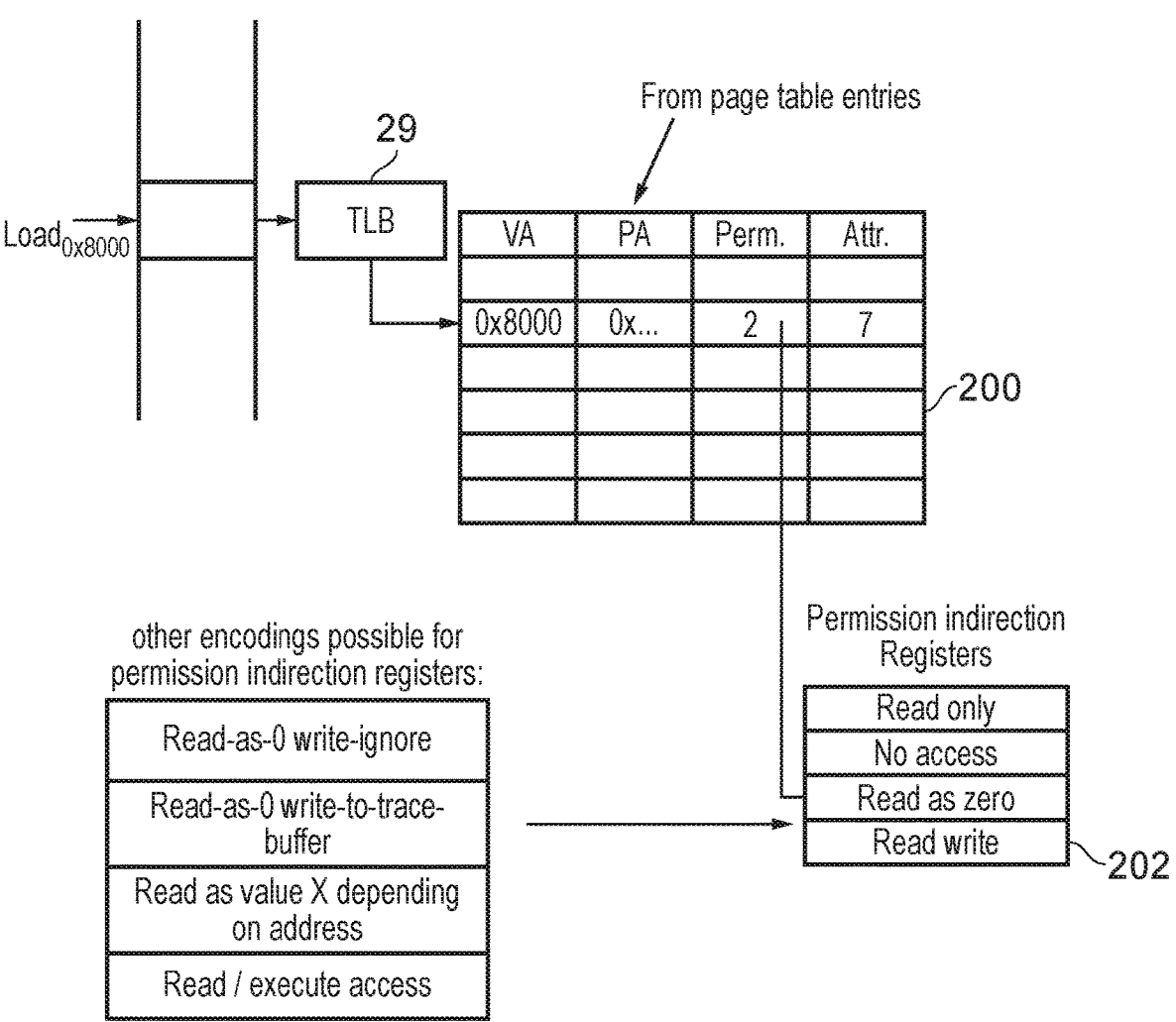
FIG. 6 illustrates use of a permission indirection table to support a greater number of permission types than can be directly encoded in the page table information.

Alternatively, as shown in FIG. 6, an indirection table may be used to define information about the read-as-X property. This could be useful if the page table format does not have sufficient spare encoding space to add support for the desired number of variants of the read-as-X property. This can be particularly useful if there is more than one variant of the read-as-X property desired to be supported, such as variants of read-as-X corresponding to different values of the specified value X or different read-as-X write behaviours as discussed above.

As shown in FIG. 6, a page table structure 200 may associate a virtual address with a translated address (in this example a physical address, although in the stage-1 translation of a two-stage translation process the translated address could be an intermediate address instead), and one or more access permission or attribute fields. While the virtual address is shown explicitly in the table structure in FIG. 6 for ease of explanation, it will be appreciated that in practice the virtual address may be used to index the structure and so does not need to be explicitly stored in the table structure itself.

In this example the permissions field references a set of permission indirection registers 202 implemented as control registers of the MMU 28. The permission indirection registers represent an indirection table which is programmable by software instructions executing at a certain privilege level or higher, and select from a variety of supported permission types. By using the permission indirection registers, a greater number of permission types may be supported than can be indicated by the limited number of bits in the permission field of the page table entries themselves. For example, a bit permission field may select from one of four permission indirection entries in the permission indirection registers 202, but each entry of the permission indirection registers 202 may then select from more than four different options for the corresponding permission type. Of course, the number of permission indirection entries can be greater than or less than 4.

This can then enable support for a range of different permission types for a given page, such as:
Read only: read accesses are permitted, and write or instruction fetch accesses are prohibited;
No accesses: all access to the page is prohibited;
Read/execute access: read and instruction fetch accesses are permitted, write accesses are prohibited;
Read as zero: variant of the read-as-X property where the specified value is zero (e.g. in this variant the write-fault write-behaviour may be used as shown at step 158 of FIG. 5);
Read/write: read and write accesses are permitted, instruction fetch accesses are prohibited;
Read-as-O write-ignore: a variant of read-as-zero where the write-ignore behaviour of step 160 of FIG. 5 is used when a write is requested to a read-as-X page;
Read-as-0 write-to-trace-buffer: a variant of read-as-zero where the read-as-X write behaviour to use is option 3 in FIG. 5 with the predetermined system location being the trace buffer 42;
Read-as-X depending on address: a variant of read-as-X property where the value of X depends on the address of the read request as explained further in FIG. 8 below.
It will be appreciated that these are just some example encodings that could be possible and many other permission types could also be used. In general, the software may select the values to write to the permission indirection registers so as to select a particular subset of the available permission types supported in the ISA for selection by page table entries, to reduce the number of bits required in the page table entries themselves to less than the number of bits that would be required for encoding a selection from the full range of supported permission types. While FIG. 6 shows the indirection registers 202 as specifying options available for selection for the permission field of the page table entries, other implementations could apply the indirection table approach to the attribute field. The read-as-X property could be regarded as a memory attribute rather than a permission, and so could be encoded directly or indirectly within the attribute field instead of the permission field as shown in the example of FIG. 6.

FIG. 7 illustrates use of further indirection to specify the particular value X to be returned for a read to a read-as-X page of memory. Again, the page table structure 200 uses an indirection table 202 specified in control registers of the MMU 28 to define which permission type is to be selected for a given page, with the page table entry specifying in its permissions field an entry identifier specifying one of the entries of the indirection table 202. For at least some encodings of the indirection table entries, the value of the indirection table entry may be interpreted as a further reference to an entry of a further indirection table 204 stored in control registers. This may be useful to support a wider range of possible values for the specified value X for a read-as-X page, where the initial indirection table may specify whether the page is a read-as-X page or a non-read-as-X page, and could specify other properties of the read-as-X property such as the read-as-X write behaviour or the type of system component to be forwarded with write data for a read-as-X page, but for at least some encodings designated as denoting a read-as-X page of memory, the encoding may be interpreted as a reference to the further indirection table 204 where the referenced entry specifies the particular value to be returned four reads to the read-as-X page of memory. This approach would enable a wide range of numeric values to be specified for read-as-X accesses, without requiring the permissions field in the main page tables to be expanded to a sufficient number of bits to indicate the specified value. This is beneficial because the indirection table 202 and further indirection table 204 may be specified once globally for all pages, whereas the page table entries 200 would be provided on a page-by-page basis and so expanding the size of the permission or attribute fields of the page table structure to specify arbitrary data values as the specified value X to be returned for a read-as-X page would greatly increase the size of the page table structures.

While FIG. 7 shows an approach using a further indirection table 204 to specify a selection from a number of different values for the specified value X, in other approaches the selection of the particular value of X could be combined with the other information in the indirection table 202 so that no further indirection table 204 is needed.

Figure 8:
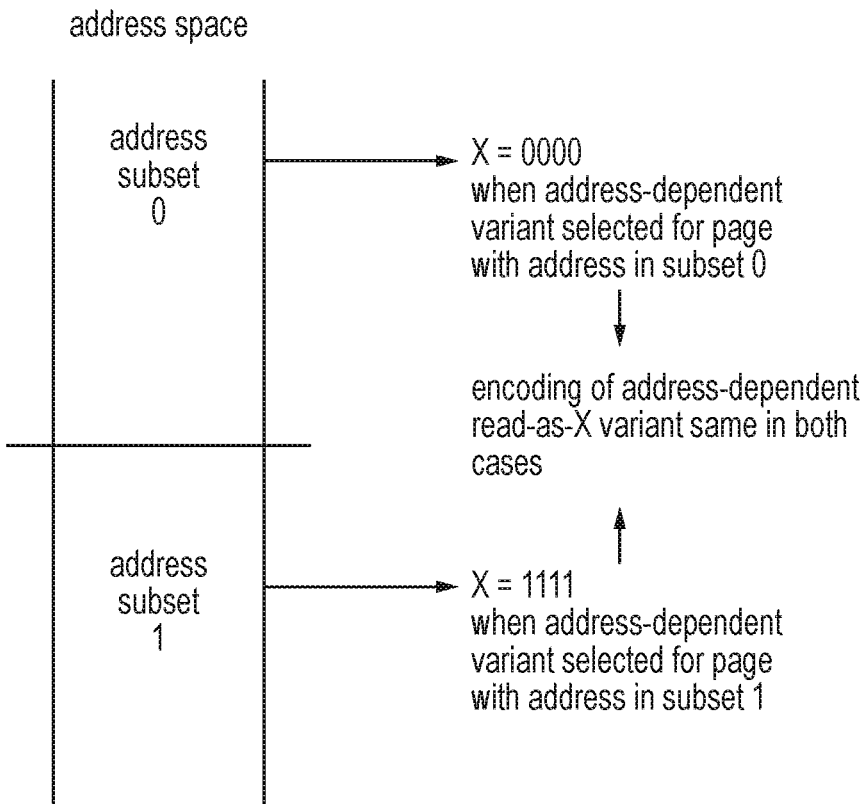
FIG. 8 illustrates an address-dependent variant of the read-as-X property.

FIG. 8 illustrates in more detail an example behaviour for the "read as value X depending on address" variant of the read-as-X property shown in FIG. 6. In this case, for two pages with an identical encoding of the read-as-X property, but which are in different ranges of the address space, different values of the specified value X can be returned for read accesses to those pages. For example, one or more bits of the read target address (e.g. a most significant portion of the address, excluding any upper bits not used to select memory access locations in memory) can be used to select which value should be returned as the specified value X. This could be useful because some instruction set architectures use different ranges of the address space for different purposes, such as using addresses at a lower part of the address space (with upper bits equal to 0) for user data and user program code and using addresses at an upper part of the address space (with upper bits equal to 1) for kernel (operating system) data and kernel program code. For some use cases, it may be desired that the default value to be returned as the specified value X for accesses to read-as-X memory should differ for the user level accesses and the kernel level accesses. For example, when the read-as-X approach is used for handling allocation tags in a system supporting memory tagging as discussed further with respect FIG. 9 below, it may be useful to assign different tag values to the read-as-X pages used by the user accesses and the kernel accesses respectively, so that user accesses to kernel data will result in mismatching tags. By providing an address-dependent variant of the read-as-X property, this avoids the need for two separate permission/attribute type encodings to be allocated for the different values of X to be used in different ranges of the address space, saving encoding space in the page table information or the indirection table, which can free up at least one other encoding of a page table entry or indirection table entry for other purposes. While FIG. 8 shows an example where the address space is divided in two, and so two different ranges of addresses correspond to different values of the specified value X, it will be appreciated that other approaches could use more than two bits of the target address to select which value to use for the specified value X, and in this case the address space may effectively be divided into more than two regions corresponding to different values of X for read-as-X pages.

Also, it is not essential to use the most significant bit of the address to select the value of X. In an example using one or more bits at a less significant bit position of the address to select the value of X, this would have the effect of a number of alternating regions of address space which alternate in the value of X, which could be useful, for example, to cycle through allocation tag values to reduce the amount of physical storage and explicit tag writing operations needed to set the allocation tag values for a given range of memory to alternating values on a block-by-block basis.

The read-as-X property can be particularly useful for systems supporting memory tagging, to enable allocation tags having a certain tag value to be represented without needing to commit physical memory to store those tags. FIG. 9 illustrates the concept of memory tagging, which can be used to deal with the problem that some higher level programming languages, such as C and C++, are considered memory-unsafe in that they do not include run time error detection checks for checking for certain errors relating to memory accesses. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;

Use-after-free errors, in which an access to a memory location is made after that memory location has already be deallocated or freed;

Use-after-return, in which a memory access to an address associated with a variable used within a function (such as a value on a stack) is made after already returning from the function;

Use-out-of-scope errors, in which variables are accessed outside of the scope in which they are declared; and Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory errors.

One approach for protecting against certain memory usage errors of the type discussed above may be to provide allocation tags which are stored in a memory system in association with blocks of one or more memory locations. When a tag-guarded memory access operation is requested based on a target address identifying a particular addressed location in the memory system, tag checking circuitry may compare an address tag that is associated with the target address with an allocation tag that is stored in the memory system in association with a block of one or more memory locations which includes the addressed location identified by the target address. The tag checking circuitry may generate an indication of whether a match is detected between the allocation tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can generate instructions that, when regions of memory are initialised, cause the allocation tags for blocks of memory which the code is expected to access to be set to particular values, and associate matching address tag values with the pointers used to provide target addresses pointing to those blocks. If a memory usage error occurs, and for example the address pointer is used out of scope or extends out of the bounds of the valid range which was initialised, then it may be likely that the allocation tag associated with the addressed location may not match the address tag associated with the target address, and then the indication of whether a match is detected can be used to trigger some error handling response or error reporting mechanism. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

Figure 9:
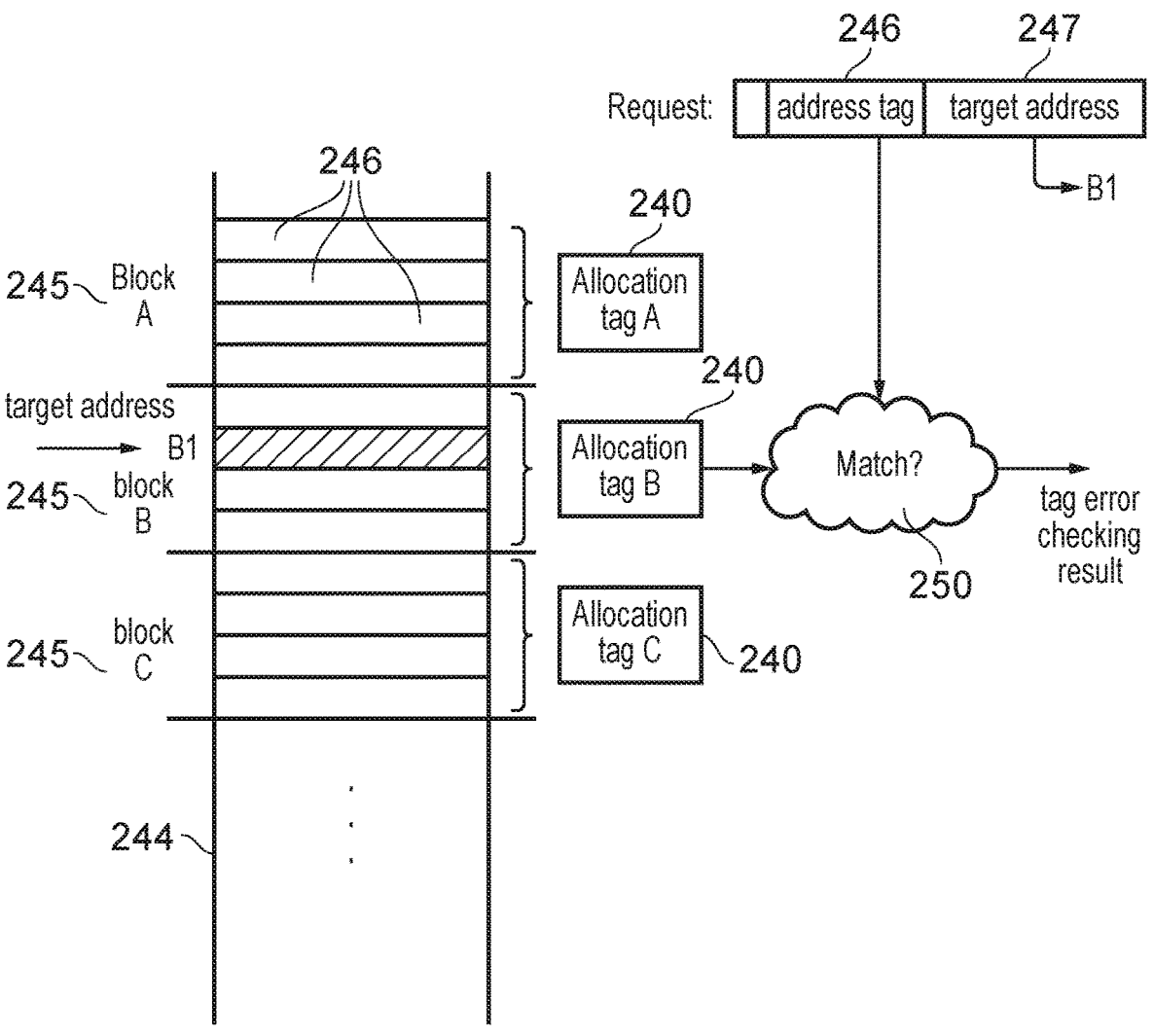
FIG. 9 illustrates a tag checking operation.

Hence, as shown in FIG. 9, when a tag checking mode is supported, the physical address space 244 used to refer to memory locations within the memory system may be logically partitioned into a number of blocks 245 each comprising a certain number of addressable locations 246. For conciseness, in the example of FIG. 9, each block 245 comprises four memory locations 246, but other block sizes could be used as well. Each block 245 is associated with a corresponding allocation tag 240. The allocation tags associated with a certain number of blocks 245 can be gathered together and stored either within a different architecturally accessible memory location within the physical address space, or within additional storage locations provided in the memory system which are not architecturally accessible (not mapped to the same physical address space). The particular mapping of which tag storage locations correspond to each block 245 may be hardwired or could be programmable.

Hence, when a tag-guarded memory access is required (e.g. certain memory access instruction opcodes could be assigned to denote tag-guarded memory accesses, or alternatively any memory access issued when operating in a tag checking mode could be considered tag-guarded), an address tag 246 (which is associated with the target address 247 identifying the addressed location to be accessed), is compared against the allocation tag 240 which is associated with the block of memory locations 245 which includes the addressed location. For example, in FIG. 9 the target address 247 points to a certain location B1 in memory. Therefore, the allocation tag B which is associated with the block of locations B including location B1 is compared by tag checking circuitry 250 against the address tag 246 associated with the target address 247. As shown in FIG. 1, the tag checking circuitry 250 can be considered part of the processing circuitry 4, or alternatively (not shown in FIG. 1) the tag checking circuitry 250 could be implemented as part of the memory system. As shown at the top of FIG. 9, the address tag 246 may be determined as a function of selected bits of the target address 247 itself. In particular, the address tag may be determined from bits within a portion of the target address which is unused for indicating the specific memory location which is to be selected as the addressed location 44 (selection of the target location B1 does not depend on these bits). For example, in some architectures the top portion of bits of the target address may always have a certain fixed value such as a sign extension (all 0s or all 1s) and so are not meaningful—these upper bits are not used to select a memory location to access. Therefore, an address can be tagged with the address tag 246 by overwriting these unused bits with an arbitrary tag value. The particular address tag value can be selected by a programmer or compiler for example. The address tag 246 and allocation tag 240 can be a relatively small number of bits, e.g. 4 bits, and so need not occupy much space within memory storage and within the target address. Providing 4 bits of tag space, i.e. 16 possible values of the tags, can often be enough to detect many common types of memory access errors.

Hence, when a tag-guarded memory access is performed, the tag checking circuitry 250 compares the address tag 246 associated with the target address with the allocation tag 240 associated with a block 245 of memory locations including the addressed location B1, and determines whether they match. The tag checking circuitry 250 generates a match indication indicating whether the address tag 246 and the allocation tag 240 matched. For example, this match indication could be a fault signal which is generated if there is a mismatch between the address tag 246 and the allocation tag 250, triggering an exception handler to deal with the cause of the fault. Also, the match indication could be an indication placed in a status register indicating whether there was a match, or an entry added to an error report to indicate the address for which the error was detected and/or the instruction address of the instruction which triggered the error. Some implementations may prevent the memory access which causes a tag check error from being successful, while other approaches may allow the memory access to proceed despite the tag check error, but record the error in an error log which could be made available to a software provider of the code to assist the provider with eliminating errors in subsequent versions of the software. Hence, it will be appreciated that there are a range of ways in which the tag match/mismatch indication could be generated by the tag checking circuitry 250.

In embodiments which use a portion of the target address 247 to determine the address tag 246, note that this address tag is different to a tag portion of the target address which may be used by caches 30, 32 to determine whether the information from the addressed location identified by the target address is stored within the cache. Many caching schemes may store a tag portion of the address of a cached piece of data alongside that data within the cache, so that on searching the cache for a given address, part of the address can be compared with the tags stored alongside the cached data in order to determine whether the cached data actually corresponds to the required address. However, in this case the tag portion of the address, which is compared with the tag in the cache, would be part of the portion of the address which actually identifies the particular addressed location for which the data is required, i.e. changing the cache tag portion of an address would by definition result in the address pointing to a different addressed location within the memory system. In contrast, with the address tag used for the tag-guarded memory operation, the memory access circuitry may select the addressed location for which a data access is required independent of the address tag. That is, even if the address tag 246 is set to different values, the addressed location B1 referenced by the target address may still be the same, as the selection of the addressed location B1 depends only on other portions of the target address 247 and is independent of the portion used for the address tag 246. This gives the freedom for compilers to set the address tags associated with particular addresses to any value to match the corresponding allocation tag values which have been allocated to the relevant blocks of data in the memory system.

The tag checking circuitry 250 can be located at different parts of the system 2. In some instances the tag checking circuitry may be located within a processing element (e.g. CPU) as shown in FIG. 1. Other examples may locate the tag checking circuitry closer to the memory storage 16 which stores the accessed data and tags.

In a system which supports memory tagging, to define the allocation tags 240 for the ranges of the address space desired to be protected using memory tagging, this may (in the absence of support for a read-as-X property) require a relatively large amount of physical memory storage to be committed for storing of the allocation tags. However, it is recognised that in practice a reasonable fraction of the allocation tags may be set to a specified value, such as zero, and so this may waste a relatively significant fraction of the available physical storage. By using the read-as-X property for pages assigned for storing allocation tags having the specified value X, this reduces the amount of physical memory that has to be committed for storing tag values and hence makes more efficient use of the available physical storage. Hence, when a tag guarded access is requested, the address of the corresponding allocation tag may be derived by the MMU 28 from the target address of the data being read/written according to a mapping scheme implemented by the MMU 28 (e.g. either a hardwired mapping of data location addresses to tag location addresses, or a programmable mapping based on a tag mapping table programmable in software), and if the address required for the tag access is determined based on page table information as mapping to a read-as-X page, the MMU 28 can generate the specified value X without accessing the cache 30, 32 or memory 34, and return the specified value X of the requested allocation tag to the tag checking circuitry 250 which may then compare the specified value X against the address tag 246 of the corresponding address, to determine whether any tag check error has arisen. The read-as-X property could also arise for the data access, so is not limited to use for tag accesses.

For supporting memory tagging, it could be useful to provide a variant of the read-as-X property where the property indicates that a read access should return in part a value read from the cache 30, 32 or memory 34 and for the other part an implicitly defined specified value X which is implied from the read-as-X property, such as zero. This could be useful to allow the allocation tag for a region of memory to be returned alongside the corresponding data in a read access, without needing the allocation tag itself to be stored in physical memory when it has the value value X associated with the read-as-X property. Hence, read-as-X can allow X to replace some bits in a single (possibly cache line sized) read access. For example, a cache line could be (nominally) considered to store multiple data bytes and a single MTE-like "tag" byte, although the tag byte may not need to be physically stored if it can be implied using the read-as-X memory property. For example, the physical memory corresponding to a 4 KB page having the read-as-X property may physically store 256 sets of 128-bit data values, but the corresponding virtual page may actually be considered to map to 256 sets of 132-bit values, each 132-bit value comprising the 128 bits of the normally accessed data and a 4-bit tag returned as value X implicitly determined based on the read-as-X property. Hence, a cache-line sized read to an address within that page would return the 132-bit value including the tag, not just the 128 bits of physically stored data. This enables the tags for a region of virtual memory to be defined without committing physical storage.

It will be appreciated that a number of variants of the read-as-X property have been described above, and any particular system implementation may support any one or more of these variants.

Figure 10:
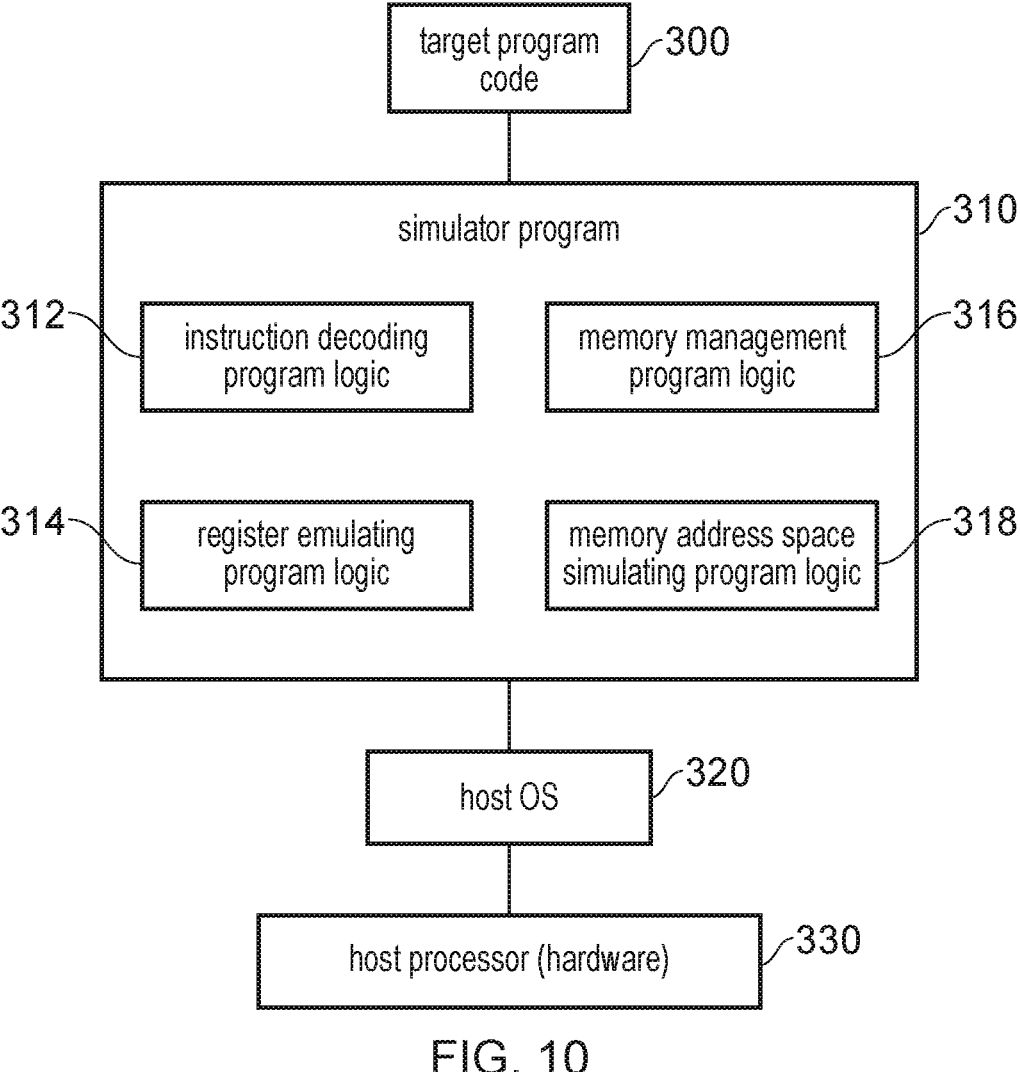
FIG. 10 illustrates a simulator example.

FIG. 10 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure stored in the host storage (e.g. memory or registers) of the host processor 330. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the interface of the hardware architecture being modelled by the simulator program 310. Thus, the program instructions of the target code 300 may be executed from within the instruction execution environment using the simulator program 310, so that a host computer 330 which does not actually have the hardware features of the apparatus 2 discussed above (e.g. the memory management circuitry 28 supporting use of the read-as-X property as discussed above) can emulate these features.

Hence, the simulator program 310 may have instruction decoding program logic 312 for decoding instructions of the target code 300 and mapping these to corresponding sets of instructions in the native instruction set of the host apparatus 330. Register emulating program logic 314 maps register accesses requested by the target code to accesses to corresponding data structures maintained on the host hardware of the host apparatus 330, such as by accessing data in registers or memory of the host apparatus 330. Memory management program logic 316 implements address translation, page table walks and access permission checking to simulate access to a simulated address space by the target code 300, in a corresponding way to the MMU 28 as described in the hardware-implemented embodiment above. Memory address space simulating program logic 318 is provided to map the simulated physical addresses, obtained by the memory management program logic 316 based on address translation using the page table information maintained by software of the target program code 300, to host virtual addresses used to access host memory of the host processor 330. These host virtual addresses may themselves be translated into host physical addresses using the standard address translation mechanisms supported by the host (the translation of host virtual addresses to host physical addresses being outside the scope of what is controlled by the simulator program 310).

When the memory management program logic 316 identifies that, for a read access by the target program code 300 to a given read target block of the simulated address space, the given read target block corresponds to a page identified using the page table information set by the target program code 300 (not the page table information used by the host for host address translation) as having the read-as-X property, the memory management program logic 316 controls the specified value X to be returned to the target program code 300 without needing to translate the simulated virtual address of the read target block to a simulated physical address or invoke the memory address space simulating program logic 318 to map the simulated physical address onto host storage of the host processor 330. Instead, the value X can be generated by program code of the simulator program 310 itself based on the identification of the read-as-X property, and made available for subsequent processing by the target program code 300. This emulates the behavior that the target program code 300 would be expected to observe if the target program code 300 was executed on the hardware apparatus 2 of FIG. 1.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to perform data processing in response to instructions;
tag checking circuitry configured to perform a tag checking operation to determine whether an address tag associated with a target address of a memory access request corresponds to an allocation tag associated with a memory system location corresponding to the target address, and to trigger a tag error handling response in response to the tag checking operation detecting a mismatch between the address tag and the allocation tag; and
memory management circuitry configured to control access to memory based on page table information capable of associating a given page of memory address space with a read-as-X property indicative that reads to an address in the given page of the memory address space should be treated as returning a specified value X; in which:
in response to determining, for a read request issued by the processing circuitry to read a read target value for a read target block of the memory address space, that at least part of the read target block corresponds to a page associated with the read-as-X property, the memory management circuitry is configured to control the specified value X to be returned to the processing circuitry as at least part of the read target value; and
in response to the memory management circuitry determining, for a tag read request to obtain a given allocation tag to be checked in the tag checking operation, that a page, corresponding to the given allocation tag, is associated with the read-as-X property:
the memory management circuitry is configured to control the specified value X to be returned as the given allocation tag; and
the tag checking circuitry is configured to perform the tag checking operation using the specified value X for the given allocation tag.

2. The apparatus according to claim 1, in which, for at least one variant of the read-as-X property, in response to determining that all of the read target block corresponds to a page associated with the read-as-X property, the memory management circuitry is configured to suppress issuing of a cache access request or memory access request for reading the read target value from a cache or the memory.

3. The apparatus according to claim 1, in which the read-as-X property is capable of being specified for both:
a page of the memory address space used for storing data; and
a page of the memory address space used for storing allocation tags.

4. The apparatus according to claim 1, in which, for at least one variant of the read-as-X property, in response to determining that the read target block corresponds to a page associated with the read-as-X property, the memory management circuitry is configured to i) control the specified value X to be returned to the processing circuitry as part of the read target value and to ii) allow a cache access request or memory access request to be issued for reading another part of the read target value from a cache or the memory.

5. The apparatus according to claim 1, in which, for at least one variant of the read-as-X property, the specified value X is zero.

6. The apparatus according to claim 1, in which, for at least one variant of the read-as-X property, the specified value X is a value having all bits set to 1.

7. The apparatus according to claim 1, in which the memory management circuitry is configured to support a plurality of variants of the read-as-X property corresponding to different values for the specified value X.

8. The apparatus according to claim 1, in which the memory management circuitry is configured to support an address-dependent variant of the read-as-X property for which, when the given page is associated with the address-dependent variant of the read-as-X property, the specified value X depends on an address of the given page so that the memory management circuitry is capable of selecting different values as the specified value X to be returned as the read target value for different pages of the memory address space associated with an identical encoding of the read-as-X property.

9. The apparatus according to claim 1, in which in response to determining, for a write request issued by the processing circuitry to write a write value to a write target block of memory address space, that at least part of the write target block corresponds to a page associated with the read-as-X property, the memory management circuitry is configured to process the write request according to a read-as-X write behaviour;

the read-as-X write behaviour comprising one of:
triggering signalling of a fault;
ignoring the write request; and
forwarding at least part of the write value to a predetermined system location.

10. The apparatus according to claim 9, in which the predetermined system location comprises one of:
a trace buffer for storing diagnostic trace information;
another processor other than a processor comprising the processing circuitry; and
a peripheral.

11. The apparatus according to claim 9, in which the memory management circuitry is configured to support a plurality of variants of the read-as-X property corresponding to different read-as-X write behaviours.

12. The apparatus according to claim 1, in which the memory management circuitry is configured to determine that the given page has the read-as-X property when a field of a page table entry corresponding to the given page has an encoding indicating the read-as-X property.

13. The apparatus according to claim 1, in which the memory management circuitry is configured to determine that the given page has the read-as-X property when a page table entry, corresponding to the given page, specifies an indirection table entry selecting value indicating a selected entry of an indirection table and the selected entry of the indirection table has an encoding identifying the read-as-X property.

14. The apparatus according to claim 13, in which the memory management circuitry is configured to support at least two different encodings for the selected entry of the indirection table which correspond to different variants of the read-as-X property.

15. The apparatus according to claim 14, in which the memory management circuitry is configured to determine the specified value X for the given page based on an encoding of a further entry in a further indirection table, the further entry indicated by an encoding of the selected entry of the indirection table.

16. The apparatus according to claim 1, in which a given page table entry corresponding to the given page of the memory address space specifies an address mapping field;

when the given page is not associated with the read-as-X property, the memory management circuitry is configured to use the address mapping field of the given page table entry to perform address translation; and when the given page is associated with the read-as-X property, the memory management circuitry is configured to use the address mapping field of the given page table entry for a purpose other than address translation.

17. The apparatus according to claim 16, in which when the given page is associated with the read-as-X property, the memory management circuitry is configured to indicate the specified value X using the address mapping field.

18. A non-transitory storage medium storing a computer program to control a host data processing apparatus to provide an instruction execution environment for execution of target code; the computer program comprising:

instruction decoding program logic to decode instructions of the target code to control the host data processing apparatus to perform data processing in response to the instructions of the target code tag checking program logic to perform a tag checking operation to determine whether an address tag associated with a simulated target address of a memory access request corresponds to an allocation tag associated with a simulated memory system location corresponding to the simulated target address, and to trigger a tag error handling response in response to the tag checking operation detecting a mismatch between the address tag and the allocation tag; and memory management program logic to control access to a simulated memory address space based on page table information capable of associating a given page of the simulated memory address space with a read-as-X property indicative that reads to an address in the given page of the simulated memory address space should be treated as returning a specified value X; in which:

in response to determining, for a read request to read a read target value for a read target block of the simulated memory address space, that at least part of the read target block corresponds to a page associated with the read-as-X property, the memory management program logic is configured to control the specified value X to be returned as at least part of the read target value; and in response to the memory management program logic determining, for a tag read request to obtain a given allocation tag to be checked in the tag checking operation, that a page, corresponding to the given allocation tag, is associated with the read-as-X property:

the memory management program logic is configured to control the specified value X to be returned as the given allocation tag; and the tag checking program logic is configured to perform the tag checking operation using the specified value X for the given allocation tag.

19. An apparatus comprising:

processing circuitry configured to perform data processing in response to instructions; and memory management circuitry configured to control access to memory based on page table information capable of associating a given page of memory address space with a read-as-X property indicative that reads to an address in the given page of the memory address space should be treated as returning a specified value X; in which:

in response to determining, for a read request issued by the processing circuitry to read a read target value for a read target block of the memory address space, that at least part of the read target block corresponds to a page associated with the read-as-X property, the memory management circuitry is configured to control the specified value X to be returned to the processing circuitry as at least part of the read target value;

a given page table entry corresponding to the given page of the memory address space specifies an address mapping field;

when the given page is not associated with the read-as-X property, the memory management circuitry is configured to use the address mapping field of the given page table entry to perform address translation; and when the given page is associated with the read-as-X property, the memory management circuitry is configured to use the address mapping field of the given page table entry for a purpose other than address translation.

* * * * *